(12) United States Patent
Jeremenko (10) Patent No.: US 11,247,325 B2
(45) Date of Patent: Feb. 15, 2022

(54) ADAPTER FOR REMOTELY SUPPORTING AND ACTUATING A POWER TOOL FROM AN END OF A HOT STICK

(71) Applicant: Jason A. Jeremenko, Wolcott, NY (US)

(72) Inventor: Jason A. Jeremenko, Wolcott, NY (US)

( * ) Notice: Subject to any disclaimer, the term of this patent is extended or adjusted under 35 U.S.C. 154(b) by 243 days.

(21) Appl. No.: 15/803,758

(22) Filed: Nov. 4, 2017

(65) Prior Publication Data

US 2018/0126541 A1     May 10, 2018

Related U.S. Application Data

(60) Provisional application No. 62/417,900, filed on Nov. 4, 2016.

(51) Int. Cl.
*B25H 1/00* (2006.01)
*H02G 1/02* (2006.01)
(Continued)

(52) U.S. Cl.
CPC .......... *B25H 1/0035* (2013.01); *B25B 21/00* (2013.01); *B25F 5/02* (2013.01); *B25J 1/04* (2013.01); *H02G 1/02* (2013.01)

(58) Field of Classification Search
CPC .......... B25H 1/0035; B25F 5/02; H02G 1/02; B25B 21/00; B25J 1/04
(Continued)

(56) References Cited

U.S. PATENT DOCUMENTS 1,718,398 A * 6/1929 Zaeske ................. B25B 7/18
                                                       294/104
1,840,150 A    1/1932 Bodendieck
(Continued)

FOREIGN PATENT DOCUMENTS

CA       2832833 A1    5/2015

OTHER PUBLICATIONS

Website: http://www.hubbellpowersystems.com/lineman/insulated/universalaccessories/clamp-stick-head.asp Downloaded Apr. 28, 2017 A Universal Clamp Stick Head for use with Eye Screw Grounding Clamps.
(Continued)

*Primary Examiner* — Thomas M Wittenschlaeger
*Assistant Examiner* — Katie L Gerth
(74) *Attorney, Agent, or Firm* — Russ Weinzimmer & Associates, P.C.

(57) ABSTRACT

A remote adapter for use with a lineman's hot stick that enables the lineman to mount a wide variety of power tools onto the far end of the hot stick for tasks involving high voltage equipment. The remote adapter allows the power tool to be actuated by pulling on an insulating pull-rope. The remote adapter includes a body for supporting the power tool, the body including: at least one slot for receiving at least one strap configured to strap the power tool to the body, at least one pivot hole for receiving a pivot pin, and a splined universal connector for attachment to a hot stick. The remote adapter also includes a lever arm that is pivotable with respect to the body. The lever arm includes a hole for receiving a trigger pin which actuates the power tool trigger when the insulating rope attached to an attachment feature is pulled.

11 Claims, 5 Drawing Sheets

(51) Int. Cl.
  *B25F 5/02* (2006.01)
  *B25B 21/00* (2006.01)
  *B25J 1/04* (2006.01)

(58) Field of Classification Search
  USPC ........................................................ 173/170
  See application file for complete search history.

(56) References Cited

U.S. PATENT DOCUMENTS

| | | | |
|---|---|---|---|
| 1,853,153 A | 4/1932 | Skeel | |
| 2,868,051 A | 1/1959 | Dupre et al. | |
| 3,057,233 A * | 10/1962 | Turner | H01R 43/042 |
| | | | 72/409.12 |
| 3,205,522 A | 9/1965 | Then | |
| 3,473,837 A * | 10/1969 | Goodman | H01H 31/006 |
| | | | 29/278 |
| 3,513,884 A | 5/1970 | Demler, Sr. | |
| 3,552,239 A * | 1/1971 | Yeaman et al. | B25H 1/0057 |
| | | | 408/146 |
| 3,949,817 A * | 4/1976 | Rice | A01G 3/08 |
| | | | 173/170 |
| 3,985,188 A | 12/1976 | Steele | |
| 4,147,220 A | 4/1979 | Swiderski, Jr. et al. | |
| 4,284,223 A * | 8/1981 | Salcido | B25C 7/00 |
| | | | 227/132 |
| 4,479,599 A * | 10/1984 | Conrad | B25C 1/18 |
| | | | 227/156 |
| 4,736,804 A * | 4/1988 | Geibel | B25H 1/0035 |
| | | | 173/30 |
| 5,130,642 A | 7/1992 | Hoffman et al. | |
| 5,295,620 A * | 3/1994 | Cousineau | B25H 1/0035 |
| | | | 173/170 |
| 5,361,851 A | 11/1994 | Fox | |
| 5,463,918 A | 11/1995 | Lemieux et al. | |
| 5,547,305 A | 8/1996 | Treche | |
| 5,564,852 A | 10/1996 | Maxwell et al. | |
| 5,593,196 A | 1/1997 | Baum et al. | |
| 5,598,892 A | 2/1997 | Fox | |
| 5,622,399 A * | 4/1997 | Albright | A62B 1/18 |
| | | | 294/24 |
| 5,785,229 A | 7/1998 | Franzini | |
| 5,787,590 A * | 8/1998 | D'Alessandro, Sr. | |
| | | | A01G 3/053 |
| | | | 16/429 |
| 5,863,160 A * | 1/1999 | Havener | B25H 1/0064 |
| | | | 408/136 |
| 5,926,913 A * | 7/1999 | Hernandez | B25B 13/481 |
| | | | 16/114.1 |
| 6,454,330 B1 * | 9/2002 | Chen | B25J 1/04 |
| | | | 294/104 |
| 6,520,428 B1 * | 2/2003 | Elam | B25G 1/04 |
| | | | 239/525 |
| 6,682,050 B1 * | 1/2004 | Ray | B65H 51/06 |
| | | | 254/134.3 R |
| 7,185,561 B1 * | 3/2007 | Eastman | H01H 85/0208 |
| | | | 294/174 |
| 7,213,490 B2 | 5/2007 | Weaver et al. | |
| 7,228,917 B2 | 6/2007 | Davis et al. | |
| 7,258,261 B1 * | 8/2007 | Reyes | B25C 7/00 |
| | | | 173/170 |
| 7,617,885 B2 * | 11/2009 | Howland | B25F 5/00 |
| | | | 173/1 |
| 7,984,665 B1 | 7/2011 | Robertson | |
| 8,020,739 B2 | 9/2011 | Blessing et al. | |
| 8,167,250 B2 * | 5/2012 | White | H02G 3/0608 |
| | | | 248/49 |
| 8,176,625 B2 | 5/2012 | Copper et al. | |
| 8,342,494 B2 * | 1/2013 | Ricci | G01R 15/186 |
| | | | 269/86 |
| 9,174,337 B2 * | 11/2015 | Buchner | B25H 1/0035 |
| 9,393,683 B2 | 7/2016 | Bevins, Jr. et al. | |
| 9,656,381 B2 * | 5/2017 | Niles | H01R 11/14 |
| 9,878,439 B2 * | 1/2018 | May | B25H 1/0035 |
| 9,916,956 B1 * | 3/2018 | Rauckman | H01R 85/25 |
| 10,646,931 B2 * | 5/2020 | Moore | B25D 17/28 |
| 10,926,399 B2 * | 2/2021 | Mikec | B25H 1/0035 |
| 2005/0276670 A1 * | 12/2005 | Freund | B25H 1/0035 |
| | | | 408/129 |
| 2006/0150779 A1 * | 7/2006 | Rider | H02G 1/04 |
| | | | 81/53.1 |
| 2007/0119608 A1 | 5/2007 | Morris et al. | |
| 2008/0029683 A1 * | 2/2008 | Draghici | B60P 3/1066 |
| | | | 248/640 |
| 2008/0265593 A1 | 10/2008 | Woodworth | |
| 2009/0091147 A1 * | 4/2009 | Taylor | H01H 31/127 |
| | | | 294/24 |
| 2011/0101716 A1 | 5/2011 | Nolte et al. | |
| 2012/0126560 A1 * | 5/2012 | Ockleston | B25F 5/021 |
| | | | 294/210 |
| 2012/0151742 A1 * | 6/2012 | Morin | B25B 31/00 |
| | | | 29/432 |
| 2012/0284997 A1 * | 11/2012 | Morin | H01R 11/14 |
| | | | 29/525.01 |
| 2018/0111203 A1 * | 4/2018 | Moore | B23B 45/003 |
| 2019/0199072 A1 * | 6/2019 | Tuchscherer | H02G 1/005 |

OTHER PUBLICATIONS

Website: http://www.macronsafety.com/universal-spline-adapter Downloaded Apr. 28, 2017 Hot Stick Universal Spline Adapter.
Website: http://www.westernsafety.com/products/Hastings/hastingspg1.html Downloaded Apr. 28, 2017 Snap On Adapters for Switch & Disconnect Sticks.
Website: http://www.electricalsafetylab.com/productdetail.asp?productID-4509&Product=MADI%20DH-1%20Double%20Header%20Universal%20Attachment Downloaded Apr. 28, 2017 MADI DH-1 Double Header Universal Attachment The Double-Header Universal Attachment tool is a unique tool that lineman can use on the end of an extendo or insulated switch stick. It allows the use of two different tools on one stick.
Website: http://www.alltrades.com.au/uploads/telescopic%20hot%20sticks.pdf Downloaded Apr. 28, 2017 Telescopic Hot/Measuring Stick Set RITZGLAS Triangular Shaped Hot Stick Sets are designed to provide the working distance and insulation to perform routine jobs on overhead electrical systems.
Website: www.tallmanequipment.com Downloaded Apr. 28, 2017 Impact Adapters.

\* cited by examiner

ADAPTER FOR REMOTELY SUPPORTING AND ACTUATING A POWER TOOL FROM AN END OF A HOT STICK

CROSS-REFERENCE TO RELATED APPLICATIONS

This application claims the priority of U.S. Provisional Application No. 62/417,900, filed Nov. 4, 2016, the entire contents of which is herein incorporated by reference.

FIELD OF THE INVENTION

This invention relates generally to power tools, and more particularly to apparatus for remotely supporting and actuating a power tool.

BACKGROUND OF THE INVENTION

Electrical linemen perform installation and maintenance work on high voltage power lines. As a routine part of their work, linemen require tools, such as tools to tighten and loosen nuts and bolts that are electrified at high voltages.

To prevent electrical shock and injury, linemen often use insulating equipment. For example, a lineman's hot stick is a non-conducting pole made from an insulating material, such as fiberglass. A hot stick includes a splined universal head at the far end of the hot stick. The splined universal head is commonly used for mounting tools to the far end of the hot stick, such as a hook, a wrench, or a saw blade. The splined universal head has a bolt hole and a circle of splined teeth which can attach to many different tools.

Traditionally, when a lineman needs to tighten and loosen nuts and bolts that are electrified at high voltages, the lineman can mount a manual ratchet tool onto the end of a hot stick. Attachment of the ratchet tool is often be achieved by drilling a hole through the end of the ratchet tool's handle, placing a bolt through the hole in the ratchet handle, and then bolting the ratchet tool to the splined universal head of the hot stick.

Once the ratchet tool is attached to the far end of the hot stick, the lineman attaches a socket to the ratchet tool to make a socket wrench. Then, then the lineman grips the near end of the hot stick, manipulates the socket wrench at the other end of the hot stick by moving the hot stick so to manually and incrementally turn the socket wrench. Since the hot stick can be many feet long, (e.g., 3 feet to 30 feet), manually manipulating the hot stick can be physically demanding.

Once the socket of the socket wrench is securely placed over a nut, or placed over the head of a bolt, the hot stick is moved in a back-and-forth motion so as to tighten or loosen the nut or bolt. Often, during this process, the socket slips off of the nut or bolt, and it requires a great effort to reposition the socket onto the nut or bolt to begin the tightening or loosening motion again. During this strenuous exercise, a lineman's shoulders, hands, forearms, and back are continually exerted, and as a result, many overuse injuries have occurred.

The use of a battery-powered power tool can greatly reduce the effort of manually using a tool, such as for tightening or loosening a nut or bolt with a socket wrench.

For applications that do not involve high voltages, it has been proposed to mount a battery-powered power tool on the end of an extension handle, or the end of an extension pole, to alleviate the strenuous nature of manually using a tool attached to the end of a handle or pole. For example, Lemieux et al. U.S. Pat. No. 5,463,918 A teaches an extension handle for hand power tools. Also, Davis et al. U.S. Pat. No. 7,228,917 B2 teaches a remote trigger actuating mechanism for a power tool supported at the end of an elongated handle or pole. Further, Ockleston US 20120126560 A1 teaches an extension pole system for many battery-powered tools. However, these devices are not suitable for use in a high voltage environment.

SUMMARY OF THE INVENTION

The remote adapter of the invention enables a lineman to mount a wide variety of power tools on the end of a lineman's hot stick. The use of a power tool at the end of a hot stick will greatly reduce the incidence of overuse injuries, such as repetitive stress injuries, for electrical linemen.

Because the remote adapter of the invention enables the use of power tools in situations involving high voltages, all the other benefits of using power tools can be realized. For example, using power tools can greatly increase a worker's productivity. A power tool driving a socket can tighten a nut or a bolt in a fraction of the time it would take to manually tighten the same nut or bolt using a manual socket wrench attached to the end of a lineman's hot stick. Therefore, the on-the-job efficiency of an electrical lineman's work will increase, allowing more work to be done in less time.

The remote adapter of the invention allows a power tool mounted on the far end of a hot stick to be activated by simply pulling on an insulating pull-rope, which remotely actuates the trigger of the power tool. The pull-rope is attached to an actuator lever arm, which has a pull member for connection to an insulating pull-rope, and a trigger member for connection to a trigger pin which actuates the power tool trigger. The dimensions of the remote adapter are sized so as to provide leverage, and optimize the pull-rope pulling force required, thereby making the invention easy to use. An exemplary length for the pull member that attaches to the pull-rope is 4.25 inches, and an exemplary length for the trigger member which moves to activate the power tool trigger is 6 inches.

A general aspect of the invention is a remote adapter for supporting and controlling a power tool in situations involving high voltage equipment. The remote adaptor is also configured to be supported by a power lineman's hot stick. The remote adapter includes: a body for supporting the power tool, the body including: a strap portion having at least one slot for receiving at least one strap, and a curved surface configured to accommodate a power tool handle when the power tool handle is strapped to the strap portion; and a hole portion having at least one body pivot hole for receiving a pivot pin, and a splined universal connector configured to be detachably connected to a splined universal head of a hot stick; an actuator lever arm, for actuating a trigger of the power tool, the actuator lever arm including: a pull member having a rope attachment feature for attaching a non-conductive pull rope; and a trigger member having a trigger pin hole for receiving a trigger pin; an arm pivot hole for receiving a pivot pin, the pull member extending at an angle with respect to the trigger member, the arm pivot hole being disposed along the actuator lever arm between the rope attachment feature and the trigger pin hole; a pivot pin having a first and a second end, the first end being received by the at least one body pivot hole, and the second end being received by the arm pivot hole, the actuator lever arm being pivotable with respect to the body; and a trigger pin, the trigger pin being received by the trigger pin hole of the actuator lever arm, the trigger pin being configured to actuate a power tool trigger of the power tool.

In some embodiments, the pivot pin receives at least two pivot pin retaining rings for rotatably attaching the pivot pin to the body.

In some embodiments, the trigger pin receives at least one trigger pin retaining ring for rotatably attaching the trigger pin to the actuator lever arm.

In some embodiments, the body has at least two body pivot holes to provide alternate pivot hole locations for the actuator lever arm, so as to configure the pivot pin to be proximal to the power tool trigger.

In some embodiments, the body is configured to accommodate a power tool battery pack.

In some embodiments, the strap can be one of: a hose clamp, a zip tie, an elastic band, and a hook and loop material strap assembly.

In some embodiments, the pivot pin receives three pivot pin retaining rings, one pivot retaining ring located against the actuator lever arm, and two pivot pin retaining rings located against the body, to rotatably support the actuator lever arm, and maintain the body and the actuator lever arm at a fixed distance.

In some embodiments, the body, the actuator lever arm, the pivot pin, the trigger pin, and the at least one strap are made of at least one of: metal, plastic, carbon fiber, and fiberglass.

Another general aspect of the invention is an adapter for supporting and controlling a power tool in situations involving high voltage equipment, the remote adaptor also being configured to be supported by a power lineman's hot stick, this remote adapter including: a body for supporting the power tool, the body including: a strap portion having at least one slot for receiving at least one strap, and a curved surface configured to accommodate a power tool handle when the power tool handle is strapped to the strap portion; and a hole portion having at least one body pivot hole for receiving a pivot pin, and a splined universal connector configured to be detachably connected to a splined universal head of a hot stick; an actuator lever arm, for actuating a trigger of the power tool, the actuator lever arm including: a pull member having a rope attachment feature for attaching a non-conductive pull rope; and a trigger member having a trigger pin hole for receiving a trigger pin; an arm pivot hole for receiving a pivot pin, the pull member extending at an angle with respect to the trigger member, the arm pivot hole being disposed along the actuator lever arm between the rope attachment feature and the trigger pin hole; a pivot pin having a first and a second end, the first end being received by the at least one body pivot hole, and the second end being received by the arm pivot hole, the actuator lever arm being pivotable with respect to the body; a trigger pin, the trigger pin being received by the trigger pin hole of the actuator lever arm, the trigger pin being configured to actuate a power tool trigger of the power tool; a non-conductive pull rope configured to attach to the pull member having a rope attachment feature; and a plurality of straps, each strap configured to be received by the at least one slot of the strap portion.

In some embodiments, the remote adapter further includes a hot stick having a splined universal head configured to be detachably connected to the splined universal connector of the hole portion of the body.

In some embodiments, the trigger pin receives at least one trigger pin retaining ring for rotatably attaching the trigger pin to the actuator lever arm.

In some embodiments, the body is configured to accommodate a power tool battery pack.

In some embodiments, the strap can be one of: a hose clamp, a zip tie, an elastic band, and a hook and loop material strap assembly.

In some embodiments, the pivot pin receives three pivot pin retaining rings, one pivot retaining ring located against the actuator lever arm, and two pivot pin retaining rings located against the body, to rotatably support the actuator lever arm, and maintain the body and the actuator lever arm at a fixed distance.

Yet another general aspect of the invention is a remote adapter for supporting and controlling a power tool in situations involving high voltage equipment, the remote adaptor also being configured to be supported by a power lineman's hot stick, this remote adapter including: a body for supporting the power tool, the body including: a strap portion having at least one slot for receiving at least one strap, and a curved surface configured to accommodate a power tool handle when the power tool handle is strapped to the strap portion; and a hole portion having at least one body pivot hole for receiving a pivot pin, and a splined universal connector configured to be detachably connected to a splined universal head of a hot stick; an actuator lever arm, for actuating a trigger of the power tool, the actuator lever arm including: a pull member having a rope attachment feature for attaching a non-conductive pull rope; and a trigger member having a trigger pin hole for receiving a trigger pin; an arm pivot hole for receiving a pivot pin, the pull member extending at an angle with respect to the trigger member, the arm pivot hole being disposed along the actuator lever arm between the rope attachment feature and the trigger pin hole; a pivot pin having a first and a second end, the first end being received by the at least one body pivot hole, and the second end being received by the arm pivot hole, the actuator lever arm being pivotable with respect to the body; a trigger pin, the trigger pin being received by the trigger pin hole of the actuator lever arm, the trigger pin being configured to actuate a power tool trigger of the power tool; and a hot stick having a splined universal head configured to be detachably connected to the splined universal connector of the hole portion of the body.

In some embodiments, the remote adapter further includes a non-conductive pull rope configured to attach to the pull member having a rope attachment feature.

In some embodiments, the remote adapter further includes a plurality of straps, each strap configured to be received by the at least one slot of the strap portion.

BRIEF DESCRIPTION OF THE DRAWINGS

The invention will be more fully understood from the following detailed description, in conjunction with the following figures, wherein.

DETAILED DESCRIPTION

Figure 1:
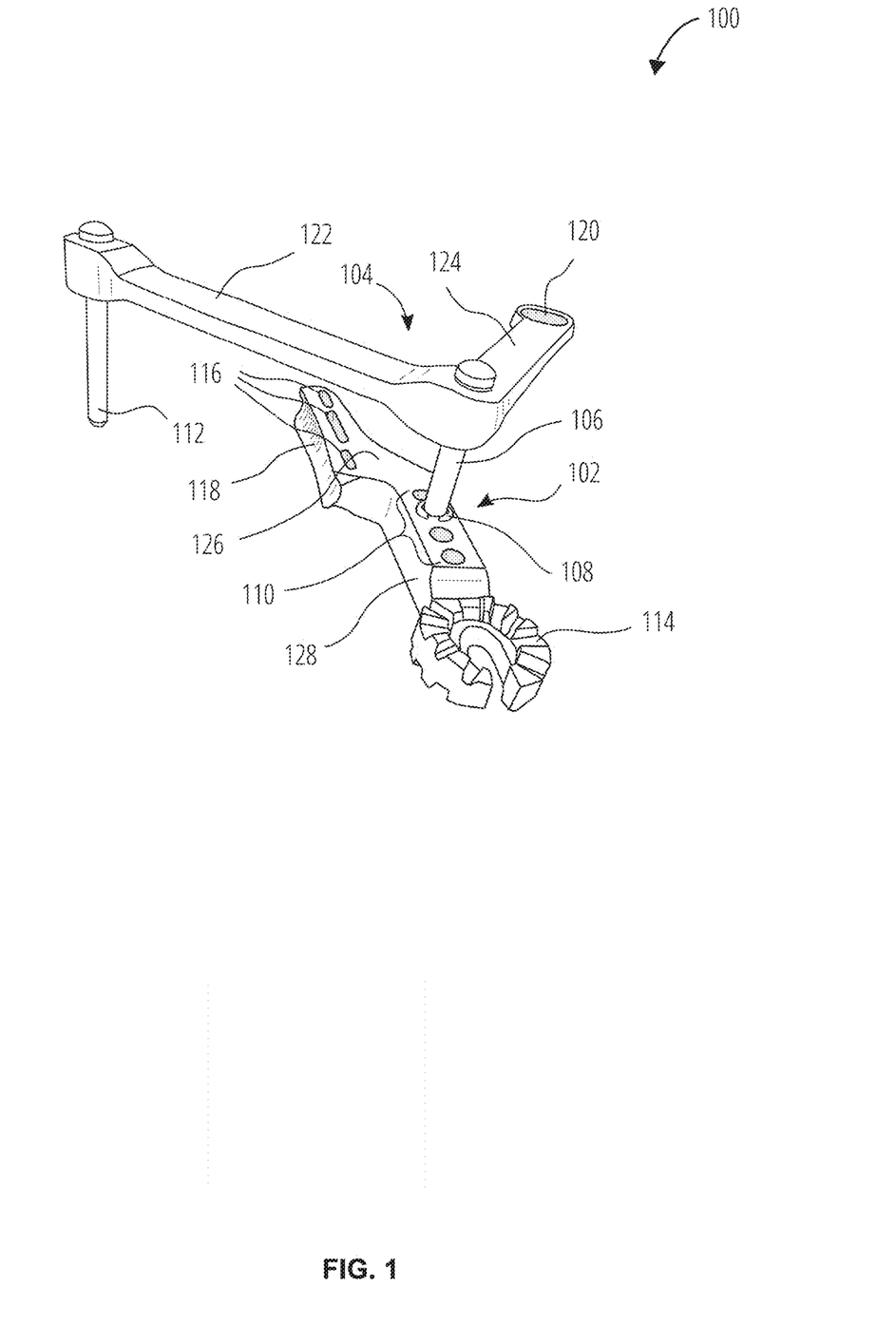
FIG. 1 is a perspective view of the remote adapter, showing a top view of the actuator arm.

FIG. 1 shows an embodiment of a remote adapter 100 having a body 102 and an actuator lever arm 104 attached to the body 102 with a pivot pin 106 that allows the actuator lever arm 104 to pivot with respect to the body 102.

In this embodiment, a hole portion 128 of the body 102 has four body pivot holes 110, one of which receives the pivot pin 106. There are four body pivot holes 110 to accommodate adjustment of the position of the actuator lever arm 104. Adjusting the position of the actuator lever arm 104 will adjust the position of a trigger pin 112, which is inserted into a trigger member 122 of the actuator lever arm 104.

In this embodiment, the pivot pin 106 is secured to the body 102 using a pivot pin retaining ring 108 on the inside surface of the body 102, and on the opposite side of the body 102 another pin retaining ring (not shown) is also used to secure the pivot pin 106 to the body 102.

The actuator lever arm 104 has a pull member 124 with a rope attachment feature 120 for attachment to a non-conductive control rope (not shown).

In this embodiment, there are three slots 116 in a strap portion 126 of the body 102 for use with at least one strap to accommodate a power tool handle firmly secured against a curved surface 118 of the strap portion 126.

In this embodiment, the remote adapter 100 is mounted on a power lineman's hot stick by engaging the teeth of a splined universal connector 114 with the matching teeth of a splined universal head (not shown) at the end of a power lineman's hot stick (not shown).

An exemplary length for the pull member 124 that attaches to the non-conductive pull-rope 314 (see FIG. 3) is 4.25 inches, and an exemplary length for the trigger member 122 which moves to actuate the power tool trigger 306 (see FIG. 3) is 6 inches. The non-conductive pull-rope 314 can alternatively be a non-conductive cord, a non-conductive string, a non-conductive cable, a non-conductive line, a non-conductive strap, or a non-conductive fiber.

Figure 2:
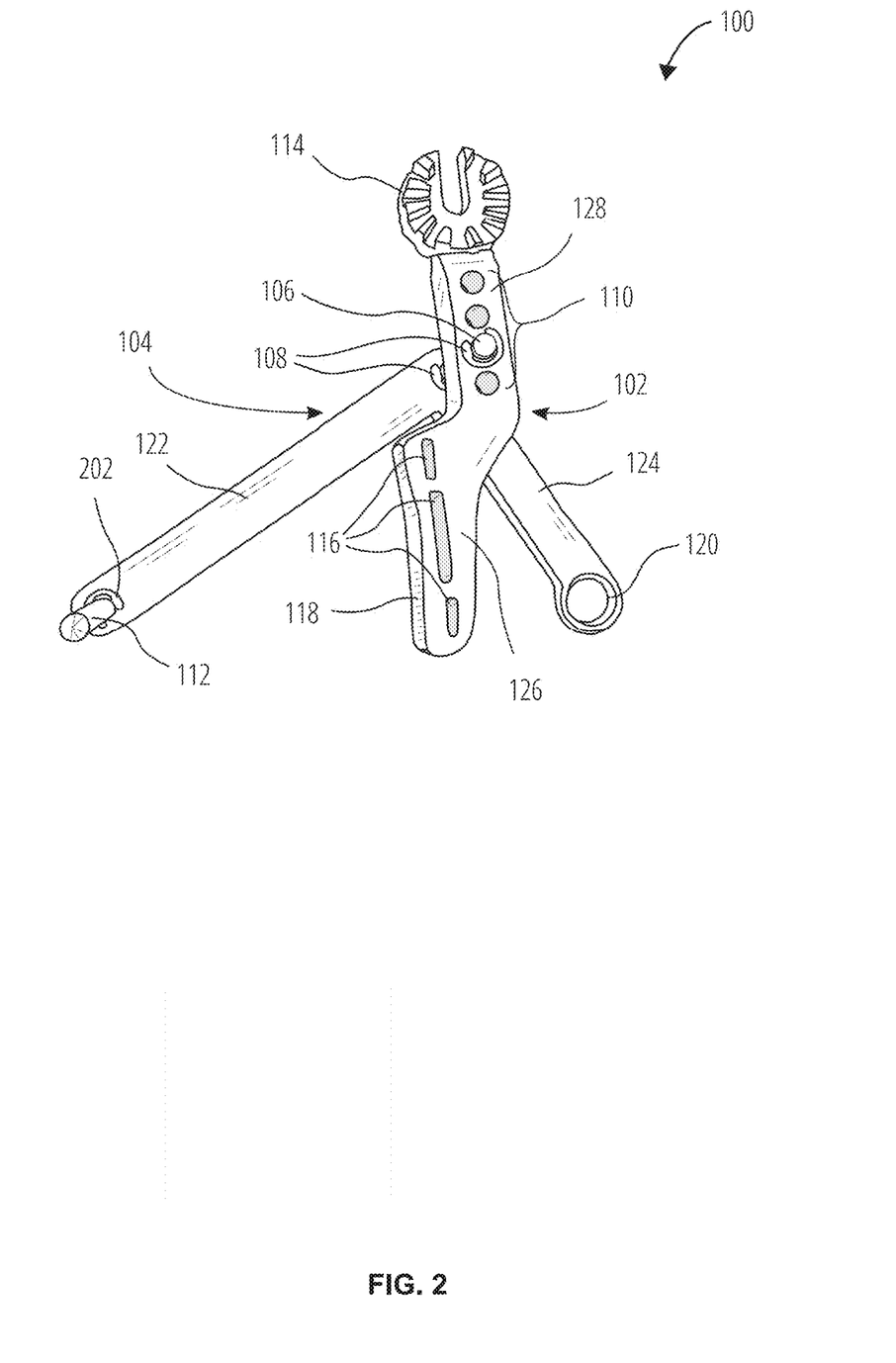
FIG. 2 is a perspective view of the remote adapter, showing a bottom view of the actuator arm, and an alternative view of the body.

FIG. 2 shows the remote adapter 100 with the body 102 in front of the actuator lever arm 104. The actuator lever arm 104 is attached to the body 102 with a pivot pin 106 that allows the actuator lever arm 104 to pivot with respect to the body 102.

The hole portion 128 of the body 102 has four body pivot holes 110, one of which receives the pivot pin 106. There are four body pivot holes 110 to accommodate adjustment of the position of the actuator lever arm 104. Adjusting the position of the actuator lever arm 104 will adjust the position of the trigger pin 112, which is inserted into the trigger member 122 of the actuator lever arm 104.

The trigger pin 112 is secured to the trigger member 122 of the actuator lever arm 104 using the trigger pin retaining ring 202.

The pivot pin 106 is secured to the body 102 using a pivot pin retaining ring 108 on the outside surface of the body 102, and on the opposite side of the body 102 another pin retaining ring (not shown) is also used to secure the pivot pin 106 to the body 102. Another pivot pin retaining ring 108 (shown in a partial view behind the body 102) is shown securing the pivot pin 106 to the actuator lever arm 104.

A pull member 124 of the actuator lever arm 104 has a rope attachment feature 120 for attachment to a non-conductive control rope (not shown).

The body 102 has three slots 116 in a strap portion 126 of the body 102 for use with at least one strap to accommodate a power tool handle firmly secured against a curved surface 118 of the strap portion 126.

The remote adapter 100 is mounted on a power lineman's hot stick by engaging the teeth of a splined universal connector 114 with the matching teeth of a splined universal head (not shown) at the end of a power lineman's hot stick (not shown).

Figure 3:
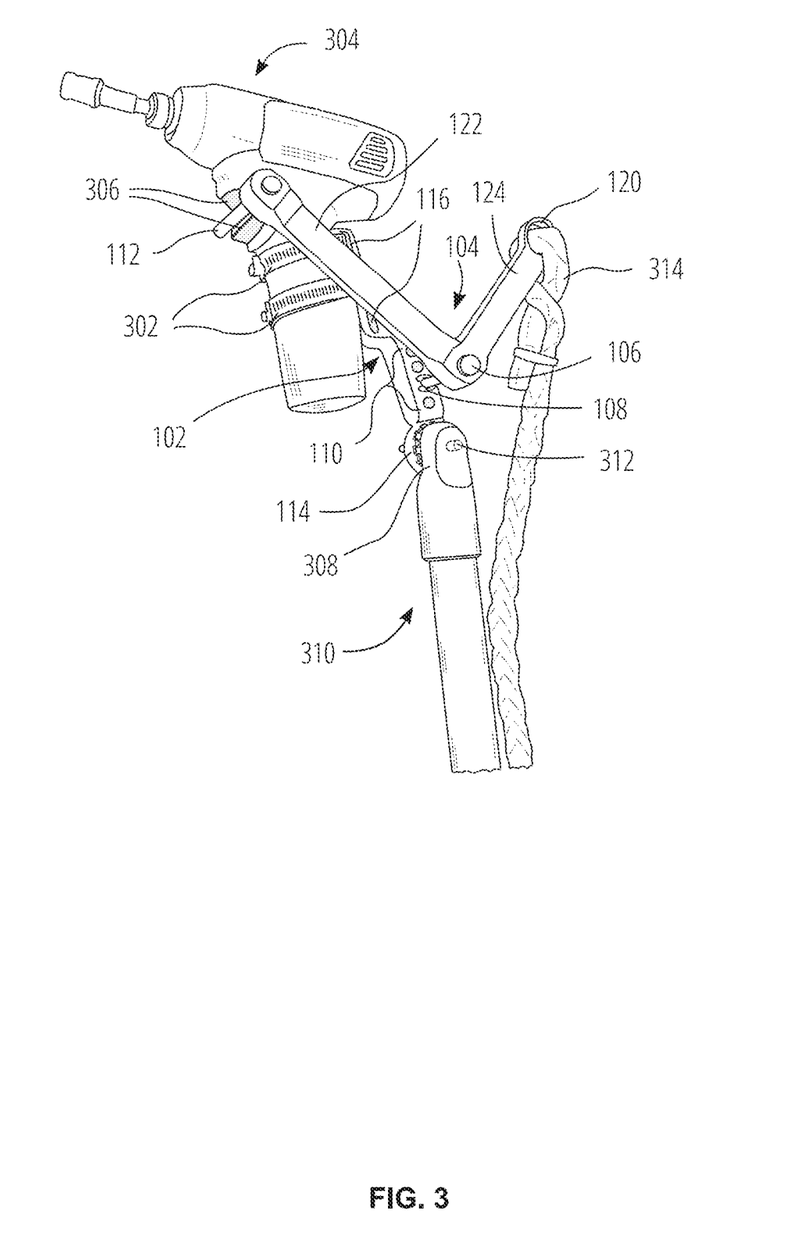
FIG. 3 is a side view showing a power tool mounted onto the remote adapter, with the power lineman's hot stick connected to the remote adapter, also showing the non-conductive control rope attached to the lever arm of the remote adapter.

FIG. 3 shows an application of the remote adapter 100 with a power tool 304.

In this view, the power tool 304 is mounted on a body 102 using two straps 302. The two straps 302 are fastened around the handle of the power tool 304, and two the straps 302 are routed through an at least one slot 116 (partially visible and partially obstructed by an actuator lever arm 104). The two straps 302 are tightened to the body 102 of the remote adapter 100.

The actuator lever arm 104 is shown above the body 102 of the remote adapter 100, with the actuator lever arm 104 having a trigger member 122 and a pull member 124. The actuator lever arm 104 is attached to the body 102 with a pivot pin 106 that allows the actuator lever arm 104 to pivot with respect to the body 102 while keeping the actuator lever arm 104 and the body 102 at a fixed distance from each other.

In this view, the pivot pin 106 is secured to the body 102 using a pivot pin retaining ring 108 on the surface of the body 102, and on the opposite side of the body 102 another pin retaining ring (not shown) is also used to secure the pivot pin 106 to the body 102.

In this view, the body has four body pivot holes 110, one of which receives the pivot pin 106. There are four body pivot holes 110 to accommodate adjustment of the position of the actuator lever arm 104. Adjusting the position of the actuator lever arm 104 will adjust the position of a trigger pin 112, which is inserted into the trigger member 122 of the actuator lever arm 104. By selecting the trigger pin's 112 insertion into one of the four body pivot holes 110, the trigger pin 112 is moved into the optimal position relative to a power tool trigger 306, so as to best engage with the power tool trigger 306.

To control the power tool trigger 306, the actuator lever arm 104 is pivoted about the pivot pin 106 by connecting a non-conductive control rope 314 to a rope attachment feature 120 on the pull member 124, and pulling on the non-conductive control rope 314 until the trigger pin 112 is engaged with the power tool trigger 306.

In this view, the remote adapter 100 (reference number shown in FIG. 1 and FIG. 2) is mounted on a power lineman's hot stick 310 by engaging the teeth of a splined universal connector 114 with the matching teeth of a splined universal head 308 at the end of the power lineman's hot stick 310, and fastening the two sets of teeth together using a splined universal connector screw 312.

Figure 4:
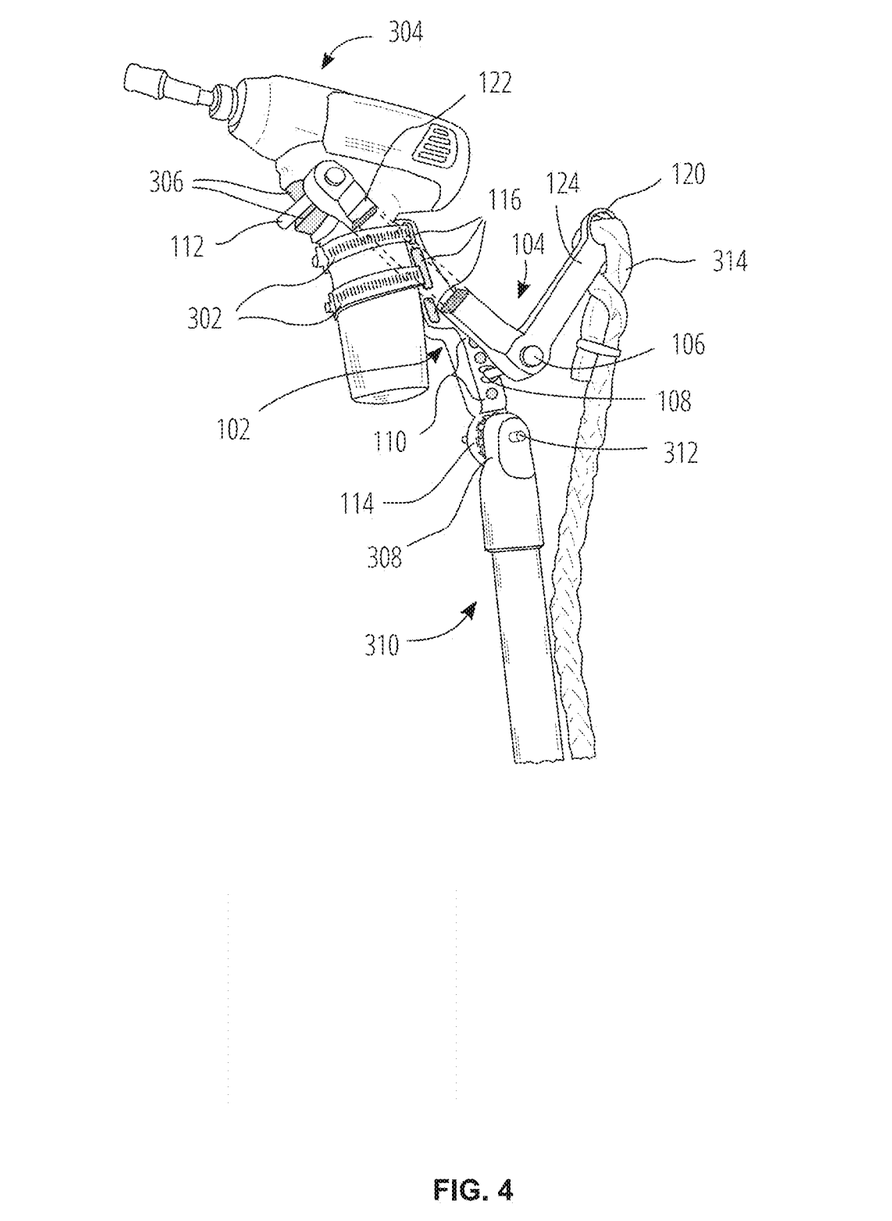
FIG. 4 is a side view showing a power tool mounted on the remote adapter, with a cut-away side view showing straps holding the power tool against the body of the remote adapter, also showing the non-conductive control rope attached to the lever arm of the remote adapter.

FIG. 4 shows an application of a remote adapter 100 with a power tool 304.

In this view, a trigger member 122 of an actuator lever arm 104 is shown in a cut-away view to reveal two straps 302 and three slots 116.

In this view, the power tool 304 is mounted on a body 102 using two straps 302. The straps 302 are fastened around the handle of the power tool 304, and the straps 302 are routed through an at least one slot 116. The straps 302 are tightened to the body 102 of the remote adapter 100.

The actuator lever arm 104 is shown above the body 102 of the remote adapter 100, with the actuator lever arm 104 having the trigger member 122 and a pull member 124. The actuator lever arm 104 is attached to the body 102 with a pivot pin 106 that allows the actuator lever arm 104 to pivot with respect to the body 102 while keeping the actuator lever arm 104 and the body 102 at a fixed distance from each other.

In this view, the pivot pin 106 is secured to the body 102 using a pivot pin retaining ring 108 on the surface of the body 102, and on the opposite side of the body 102 another pin retaining ring (not shown) is also used to secure the pivot pin 106 to the body 102.

In this view, shown are four body pivot holes 110 (three of which are indicated with lead lines), one of which holds the pivot pin 106. The four body pivot holes 110 accommodate adjustment of the position of the actuator lever arm 104. Adjusting the actuator lever arm 104 will adjust the position of a trigger pin 112, which is inserted into the other leg of the actuator lever arm 104. By selecting one of the four body pivot holes 110, the trigger pin 112 is moved into the optimal position relative to a power tool trigger 306, so as to best engage with the power tool trigger 306.

To control the power tool trigger 306, the actuator lever arm 104 is pivoted about the pivot pin 106 by connecting a non-conductive control rope 314 to a rope attachment feature 120 on the pull member 124, and pulling on the non-conductive control rope 314 until the trigger pin 112 is engaged with the power tool trigger 306.

In this view, the remote adapter 100 (reference number shown in FIG. 1 and FIG. 2) is mounted on a power lineman's hot stick 310 by engaging the teeth of a splined universal connector 114 with the matching teeth of a splined universal head 308 at the end of the power lineman's hot stick 310, and fastening the two sets of teeth together using a splined universal connector screw 312.

Figure 5:
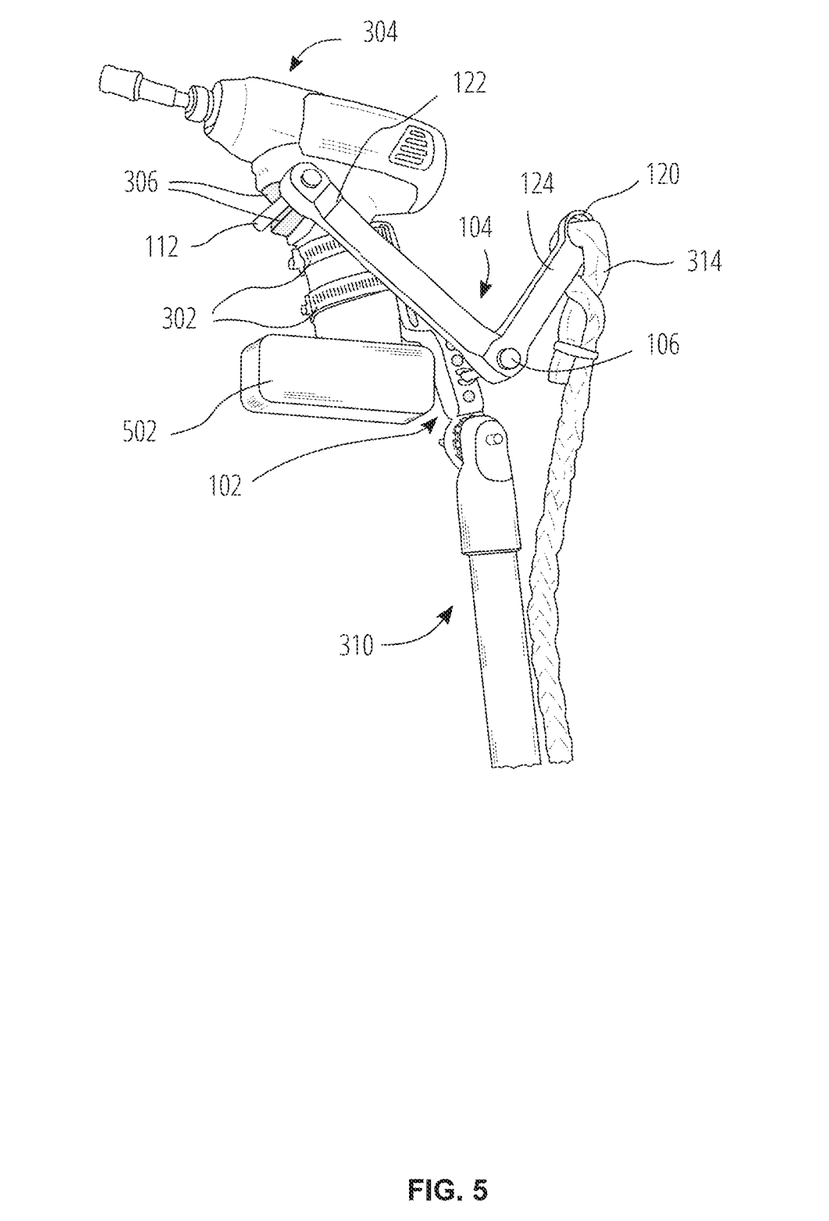
FIG. 5 is a side view showing a power tool with an attached battery pack, the power tool mounted onto the remote adapter, also showing the non-conductive control rope attached to the lever arm of the remote adapter.

FIG. 5 shows an application remote adapter with a power tool 304 with a battery pack 502.

In this view, a body 102 is configured to accommodate the shape of the battery pack 502.

In this view, the power tool 304 is mounted on the body 102 using two straps 302. The two straps 302 are fastened around the handle of the power tool 304. The two straps 302 are tightened to secure the power tool 304 to the body 102.

An actuator lever arm 104 is shown above the body 102, with the actuator lever arm 104 having a trigger member 122 and a pull member 124. The actuator lever arm 104 is attached to the body 102 with a pivot pin 106 that allows the actuator lever arm 104 to pivot with respect to the body 102 while keeping the actuator lever arm 104 and the body 102 at a fixed distance from each other.

The actuator lever arm 104 has the pull member 124 with a rope attachment feature 120 for attaching a non-conductive control rope 314, and the trigger member 122 which receives a trigger pin 112. The trigger pin 112 engages a power tool trigger 306 to control the power tool 304.

To control the power tool trigger 306, the actuator lever arm 104 is pivoted about the pivot pin 106 by connecting the non-conductive control rope 314 to the rope attachment feature 120, and pulling on the non-conductive control rope 314 until the trigger pin 112 is engaged with the power tool trigger 306. In this view, the remote adapter 100 (reference number shown in FIG. 1 and FIG. 2) is mounted on a power lineman's hot stick 310.

Other modifications and implementations will occur to those skilled in the art without departing from the spirit and the scope of the invention as claimed. Accordingly, the above description is not intended to limit the invention, except as indicated in the following claims.

What is claimed is:

1. An adapter, configured to be coupled to a power linesman's hot stick, for remotely supporting and controlling a power tool used on equipment workpieces energized by high voltage, the adapter comprising:
   a body configured to support the power tool, the body including:
      a first portion terminating at a first end of the body configured to receive and secure the power tool; and
      a second portion terminating at a second end of the body having a plurality of body pivot holes, a universal connector disposed at the second end, the universal connector configured to be detachably connected to a universal head of the hot stick;
   an actuator arm for remotely actuating a trigger mechanism of the power tool, the actuator arm including a pull member and a trigger member commonly joined together at a vertex of a fixed angle formed therebetween, wherein:
      the pull member has an attachment feature disposed proximally to a first terminating end of the actuator arm by which to couple a non-conductive pull member for applying a rotational force to the first terminating end,
      the trigger member has a trigger pin disposed at a second terminating end of the actuator arm, and
      an arm pivot hole disposed through the actuator arm at the vertex of the angle formed between the pull member and the trigger member; and
   a pivot pin configured to be disposed through and rotatably secured within the arm pivot hole and a selected one of the plurality of body pivot holes,
   wherein the actuator arm is configured to actuate the power tool by applying a pulling force to the pulling member to rotatably pivot the actuator at the pivot pin until the trigger pin contacts the trigger mechanism of the power tool and the rotational force caused by the pulling force closes the trigger mechanism.

2. The adapter of claim 1, wherein at least two pivot pin retaining rings are coupled to the pivot pin for rotatably fastening the pivot pin to the body and thereby retain the pivot pin within the selected body pivot hole.

3. The adapter of claim 1, wherein the trigger pin is disposed through a trigger pin hole located at the second terminating end of the actuator arm and is retained therein by at least one trigger pin retaining ring for fastening the trigger pin to the actuator arm.

4. The adapter of claim 1, wherein the selected one of the body pivot holes locates the vertex of the pivot arm along the body to ensure best alignment between the pivot pin and the power tool trigger mechanism by which to actuate the power tool.

5. The adapter of claim 1, wherein the body is configured to accommodate the securing thereto of the power tool having a battery pack.

6. The adapter of claim 1, wherein:
   the body is curved to receive a similarly curved surface of the power tool, and
   the power tool is secured with at least one of the following: a strap, a hose clamp, a zip tie, an elastic band, and a hook and loop material strap assembly.

7. The adapter of claim 6, wherein the universal connector of the adapter and the universal head of the hot stick are both splined.

8. The adapter of claim 1, wherein the pivot pin is rotatably retained within the arm pivot hole and the body pivot hole by at least three pivot pin retaining rings, with one of the three pivot retaining rings being located proximally to the actuator arm, and two others of the three pivot pin retaining rings being located at each end of the body hole and proximally to the body, thereby maintaining the body and the actuator arm at a fixed distance from one another.

9. The adapter of claim 1, wherein when the adapter is coupled to a hot stick, the power tool is configured to be positioned with respect to the workpiece using one hand, and the power tool is configured to be actuated with the other hand of a user.

10. The adapter of claim 1, wherein the non-conductive control attachment a pull rope.

11. The adapter of claim 1, wherein the power tool is secured with a plurality of straps, each of the plurality of straps configured to be received by at least one slot disposed through a strap portion.

\* \* \* \* \*